United States Patent [19]
Zumsteg et al.

[11] 3,934,739
[45] Jan. 27, 1976

[54] SELF-ERECTING SURGE STORAGE SYSTEM

[75] Inventors: D. Bruce Zumsteg, Glasgow; Gino Origlia, Columbia; J. T. Odom, Glasgow, all of Mo.

[73] Assignee: Standard Havens, Inc., Kansas City, Mo.

[22] Filed: Feb. 13, 1974

[21] Appl. No.: 442,127

[52] U.S. Cl................................. 214/501; 214/17 C
[51] Int. Cl.² ........................................... B60P 1/64
[58] Field of Search...... 214/16 R, 17 R, 17 C, 501; 198/7 R; 52/192, 194, 197, 116, 745; 212/39 R, 39 MS, 39 A

[56] References Cited
UNITED STATES PATENTS

| | | | |
|---|---|---|---|
| 2,988,040 | 6/1961 | Aitken | 212/39 MS |
| 3,208,616 | 9/1965 | Haskins | 214/17 R |
| 3,313,435 | 4/1967 | Welk | 214/501 |
| 3,315,422 | 4/1967 | McIntyre | 52/116 |
| 3,547,291 | 12/1970 | Batterton et al. | 214/501 |
| 3,586,181 | 6/1971 | Brock | 214/17 R |
| 3,647,047 | 3/1972 | Rheinfrank, Jr. | 198/174 |
| 3,715,852 | 2/1973 | Koga et al. | 52/745 |
| 3,756,379 | 9/1973 | Rheinfrank, Jr. | 198/174 |
| 3,777,909 | 12/1973 | Rheinfrank | 214/17 C |
| 3,792,790 | 2/1974 | Brubaker | 214/17 C |

FOREIGN PATENTS OR APPLICATIONS

| | | | |
|---|---|---|---|
| 901,410 | 7/1962 | United Kingdom | 212/39 R |

Primary Examiner—Evon C. Blunk
Assistant Examiner—Jeffrey V. Nase
Attorney, Agent, or Firm—Lowe, Kokjer, Kircher, Wharton & Bowman

[57] ABSTRACT

A portable self-erecting surge storage system for temporarily storing asphaltic hotmix. The system includes a cylindrical surge bin and an elongate conveyor having a roller yoke at one end thereof to ride a track affixed on the outer surface of the surge bin. The surge bin is pivotally pinned to a subframe to enable hydraulic cylinders to pivot the bin upwardly from a horizontal transit position to an erect operational position. The roller yoke simultaneously travels up the bin track, elevating one end of the conveyor to the top of the erect surge bin. Retraction of the cylinders lowers the bin and conveyor to their transport positions for movement to another construction site.

9 Claims, 9 Drawing Figures

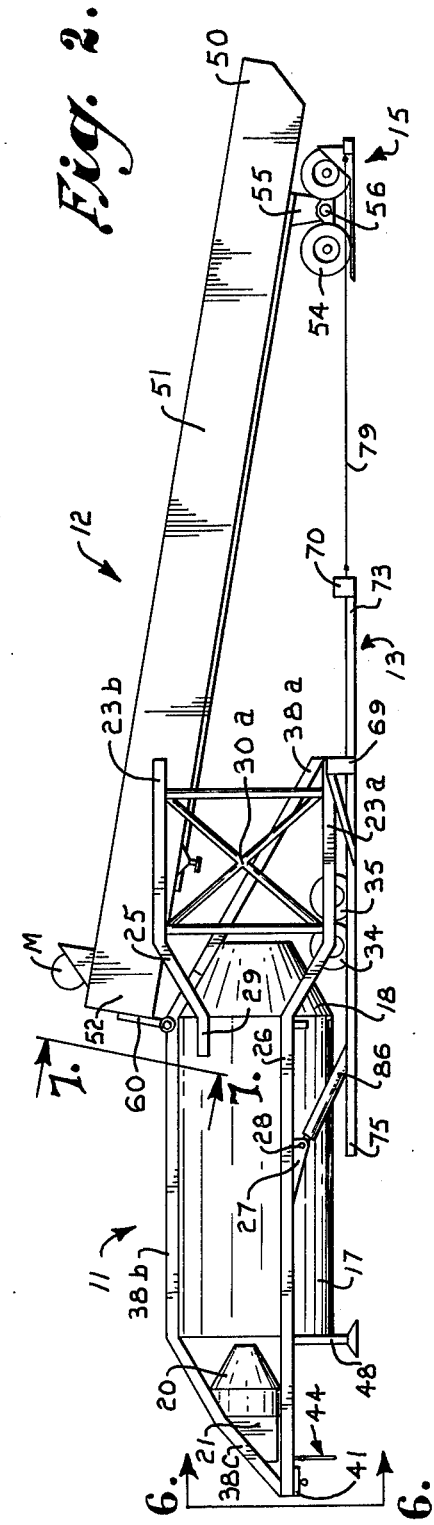
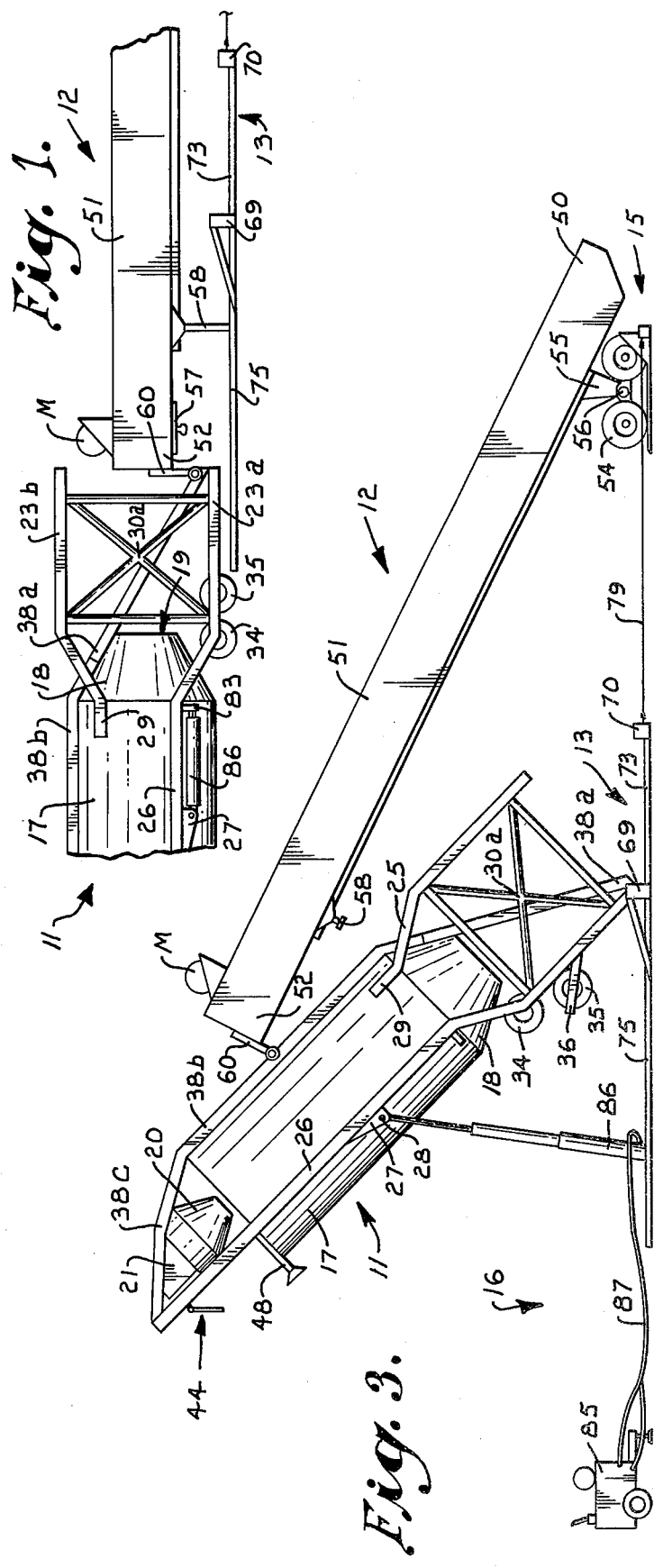

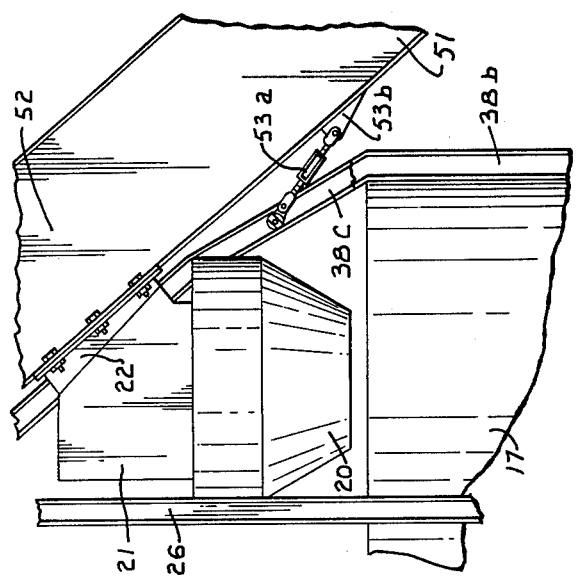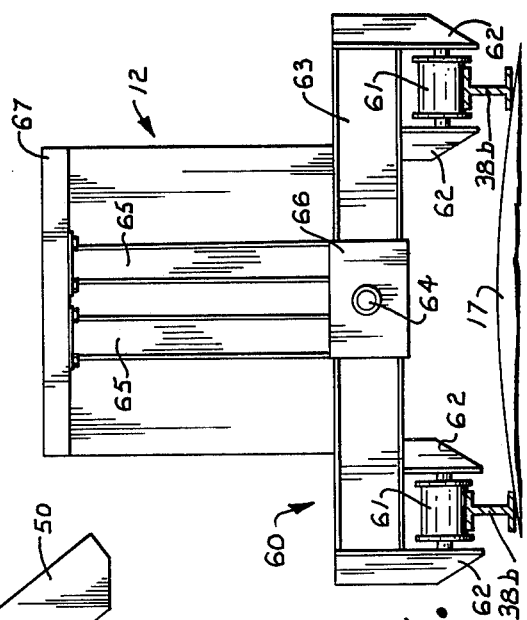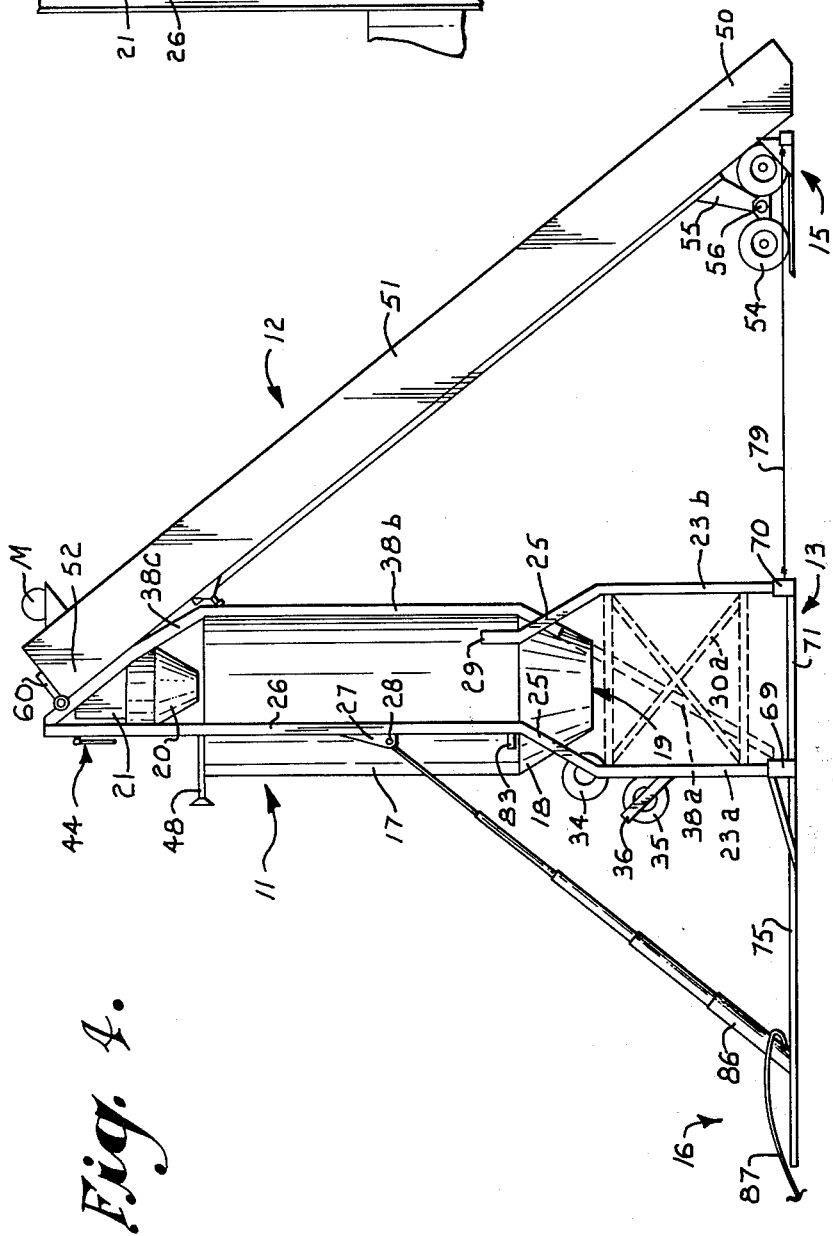

SELF-ERECTING SURGE STORAGE SYSTEM

BACKGROUND AND SUMMARY OF THE INVENTION

In the hotmix asphalt industry, the hotmix prepared in an asphalt production plant is either discharged directly into waiting dump trucks for transport to a highway construction site, or is temporarily stored in auxiliary surge storage bins from which the hotmix may be intermittently dispensed to the dump trucks. In order to minimize trucking expense, the asphalt production plant is commonly located near the construction site. However, it is frequently necessary to move the plant as one project is finished and a new one is begun, and it is therefore desirable for the plant to be easily portable for transport between different job sites. Consequently, production plants have been developed which may be dismantled, transported to a new job site, and reassembled, all without the aid of cranes or other heavy construction equipment foreign to the ordinary operation of an asphalt plant.

The development of portable asphalt plants has left the auxiliary surge storage bins and their associated conveyors for elevating the hotmix from the plant to the top of the bins as the only equipment requiring the use of a crane for erection and dismantling. Due to the tremendous size and weight of the bins and conveyors required to store large volumes of asphalt, the various attempts heretofore made to provide self-erecting storage bins have suffered from numerous shortcomings.

One self-erecting silo assembly that has been developed is disclosed in U.S. Pat. No. 3,586,181, issued to James D. Brock and entitled "Portable Self-Erecting Silo". The silo assembly of Brock basically employs an upright bin structure having telescoping cylindrical walls which may be upwardly extended. The complex erection method, however, is somewhat cumbersome, including a number of motor reversals and various manual connections and disconnections. Furthermore, in the retracted or collapsed transport position, the Brock silo presents a profile as tall as the upper cylindrical section, which is approximately half the total height of the erect silo. The upper portion of the silo, therefore, is necessarily restricted in height so that the silo can pass beneath bridges and overpasses when transported on the highway. Such a height limitation runs contrary to the goal of providing a tall, large volume storage bin.

Accordingly, a need exists in the asphalt industry for a self-erecting surge storage system to temporarily store large volumes of hotmix and to be easily transportable between job sites and quickly erected without the aid of a crane or the like. The primary goal of this invention is to meet this need.

More specifically, an object of this invention is to provide a self-erecting surge storage system, including a large volume bin and associated conveyor, that can be quickly and easily raised from a travel position to an upright operational position and that can be readily lowered from the upright position to the travel position.

Another object of the invention is to provide a self-erecting surge storage system which may be easily and quickly raised or lowered to and from an upright operational position without the aid of a crane or other special equipment normally absent in the day-to-day operations of an asphalt plant.

Another object of the invention is to provide a self-erecting surge storage system of the character described which may be raised or lowered in safety to the construction personnel with the entire erection procedure controlled by a single operator remote from the structure itself.

Yet another object of the invention is to provide a surge storage bin which may be rotatably raised from a horizontal transport position to a vertically upright, operational position without the aid of a crane or the like.

An additional object of the invention is to provide a conveyor for a self-erecting surge storage bin which may be raised from a horizontal transport position to an inclined operational position without the aid of a crane or the like. Such positioning of the conveyor is accomplished simultaneously with the erection of the storage bin in order to minimize the assembly time.

Another object of the invention is to provide a self-erecting surge storage system of the character described which is readily transportable from one job site to another.

A further object of the invention is to provide a self-erecting surge storage system of the character described which presents a low profile when transported between job sites.

Still a further object of the invention is to provide a method of erecting a substantially conventional surge storage bin and conveyor from a travel position to an operational position without the aid of a crane or the like.

Other and further objects of the invention, together with the features of novelty appurtenant thereto, will appear in the course of the following description.

BRIEF DESCRIPTION OF THE DRAWINGS

In the accompanying drawings, which form a part of the specification and are to be read in conjunction therewith, and in which like reference numerals are utilized to indicate like parts in the various views:

FIG. 1 is a fragmentary side elevational view of a preferred embodiment of the self-erecting surge storage system in a pre-erection position;

FIG. 2 is a side elevational view of the surge storage system showing a second progressive stage of the erection process subsequent to the position shown in FIG. 1;

FIG. 3 is a side elevational view of the surge storage system showing a third progressive stage of the erection process subsequent to the position shown in FIG. 2;

FIG. 4 is a side elevational view of the surge storage system showing the fully erected position of the equipment;

FIG. 5 is an enlarged, fragmentary elevational view of the upper portion of the surge storage system shown in FIG. 4 to illustrate the operational connection between the bin and conveyor;

FIG. 6 is an enlarged, fragmentary view taken generally along line 6—6 of FIG. 2 in the direction of the arrows;

FIG. 7 is an enlarged, fragmentary view taken generally along line 7—7 of FIG. 2 in the direction of the arrows;

DETAILED DESCRIPTION OF THE INVENTION

Figure 9:
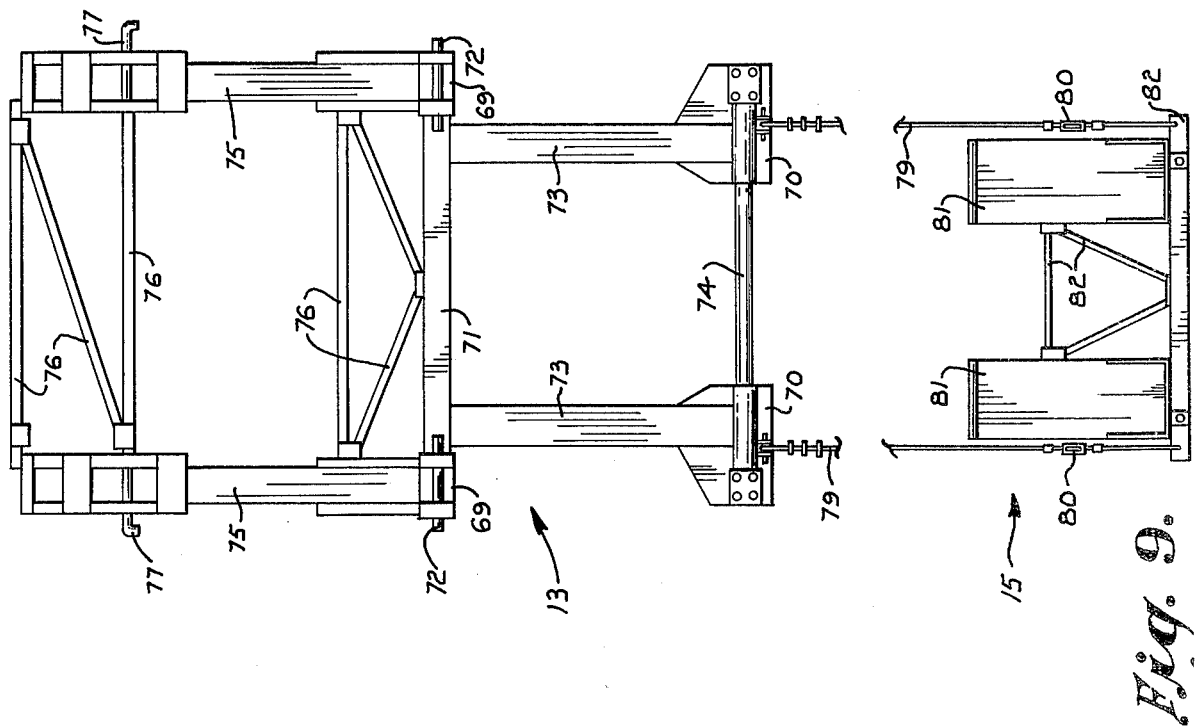
FIG. 9 is a top plan view of the compression rails, bin subframe, and conveyor wheel chock assembly which support and position the bin and conveyor.

Referring now to the drawings in more detail, the major components of the self-erecting surge storage system generally include a surge bin 11, for temporarily storing hotmix, a conveyor 12 for delivering hotmix from the asphalt production plant to the top of the bin 11, a bin subframe 13 to support and position the bin 11, a conveyor wheel chock assembly 15 to support and position the conveyor 12, and a hydraulic power system 16 employed to raise and lower the bin 11 as will be described.

It should be understood at the outset that any surge bin and conveyor such as conventionally used and known to those skilled in the asphalt industry may be readily adapted for use with this invention. The surge bin 11, shown for the purposes of illustration, typically comprises a cylindrical tank 17 integrally connected at its lower end to a frusto-conical portion 18 having a central opening 19. Associated with the discharge opening 19 are movable gates or closure members (not shown) which are activated to dispense hotmix stored in the tank 17 and frusto-conical portion 18 to loading vehicles positioned beneath the discharge 19.

The bin assembly 11 may also include an intermittent bin feeder 20 surmounting the tank portion 17 to receive hotmix from the conveyor 12 and intermittently discharge the hotmix to the tank 17 in order to prevent segregation. A more detailed description of the intermittent bin feeder 20 is found in U.S. Pat. No. 3,777,909, issued Dec. 11, 1973 to Rheinfrank, entitled "Apparatus for Loading Hotmix in a Surge Bin", and incorporated by reference herein. The feeder 20 is provided with a chute 21 having a telescopingly extendable flange 22 for connection with the conveyor 12 in order to direct hotmix flow from the conveyor into the feeder 20 as shown in FIG. 5. Conversely, the feeder 20 may be eliminated entirely for the purposes of this invention and, in such event, the hotmix would of course be discharged directly from the conveyor 12 to the surge bin 11.

A support frame for the surge bin includes four spaced apart stilt legs; the two legs seen in FIG. 2 are designated by the numerals 23a and 23b and the two legs hidden in FIG. 2 are designated by the numerals 24a and 24b. The stilt legs are of sufficient height to form a "drive-through" to allow a dump truck or similar load carrying vehicle to pass beneath the discharge 19 of the bin when it is raised to its upright vertical position.

Attached to the ends of legs 23 and 24 are bin support members 25 which angle inwardly to engage the lower end of the tank 17. As viewed in FIG. 2, the two opposed support members 25 from legs 23a and 24a are attached to elongate structural members 26 which are joined to the tank portion 17 throughout the height thereof to provide additional support and rigidity. Intermediate the ends thereof, each elongate structural member 26 carries a bracket 27 adapted to receive a pin 28 for connection with the hydraulic power system 16 later to be described. The opposite support members 25 (attached to legs 23b and 24b) are attached to structural stubs 29 which are likewise firmly secured to the surface of cylindrical tank 17.

Figure 8:
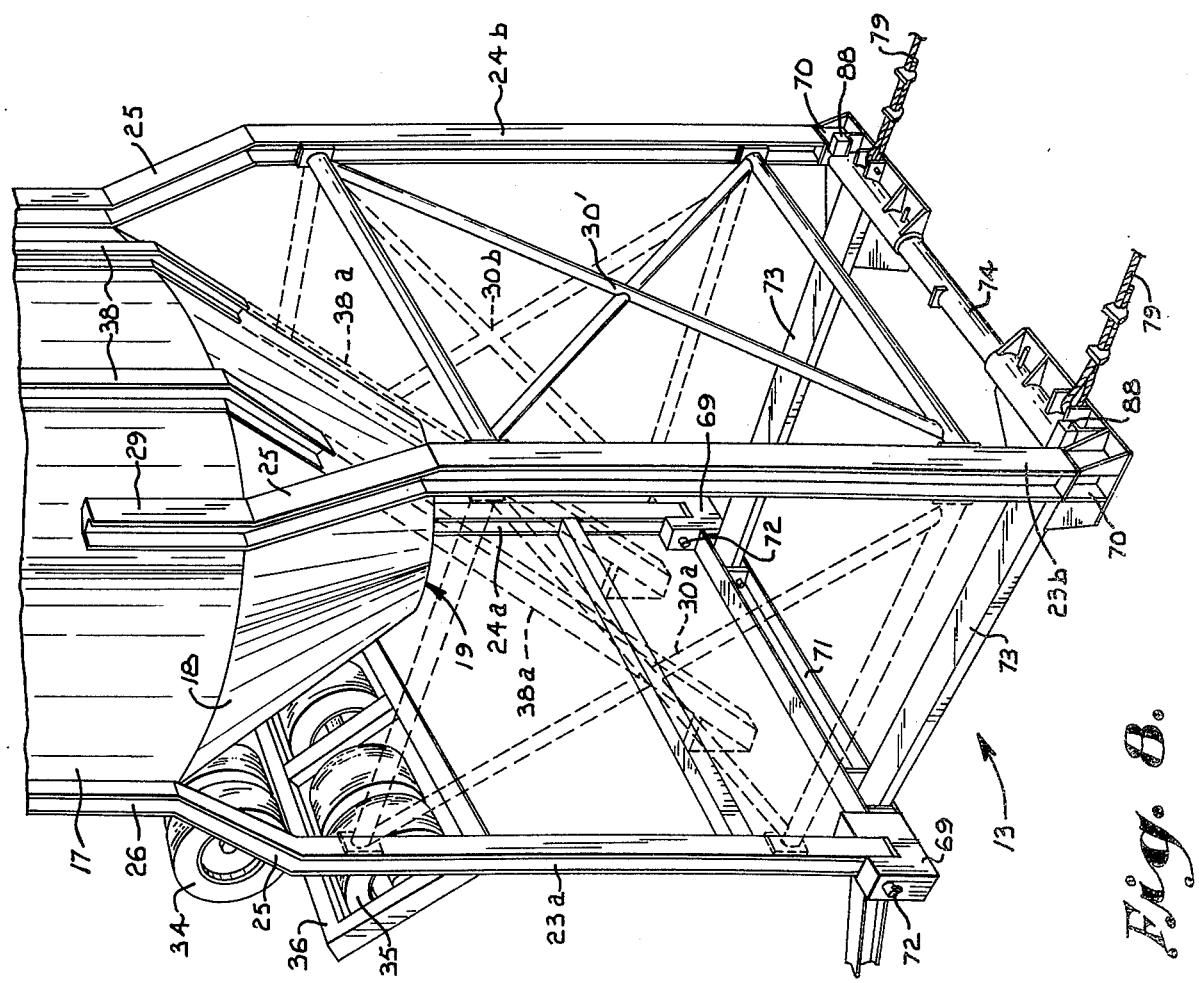
FIG. 8 is a perspective view of the lower portion of the surge storage system shown in FIG. 4, with broken lines illustrating the removable nature of certain support components which form the drive-through beneath the bin.

Between the pairs of legs 23a and 23b and legs 24a and 24b are removably bolted cross braces 30a and 30b, respectively. With reference to FIG. 8, the broken line view of cross braces 30a and 30b represents the position of the braces during transit. Upon erection of the bin 11, however, both braces 30a and 30b are removed to provide the drive-through for trucks and one of braces 30a or 30b is reconnected between legs 23b and 24b, as shown in full lines in FIG. 8 and indicated by the numeral 30', to provide additional structural rigidity.

To permit over-the-road towing of the surge bin 11, a running gear assembly is mounted near the lower end of the bin. Wheels 34 are mounted between the support members 25 attached to stilt legs 23a and 24a. As shown in FIG. 8, wheels 35 are carried on a frame 36 pivotally connected between legs 23a and 24a to rotate outwardly from the drive-through when the bin is erected. In the transit position, the frame 36 is held in substantially the same plane as the legs 23a and 24a to assist the wheels 34 in supporting the bin.

Mounted longitudinally on the surge bin 11 is an erection track comprising a pair of spaced parallel rails 38. At the lower end of the bin 11, the track assembly comprises an inclined ramp portion 38a removably secured to the frusto-conical section 18 of the bin and extended downwardly between the pairs of legs 23 and 24 and terminated in approximately the same plane as legs 23a and 24a near the lower ends of said legs. A straight section 38b of the rails extends along the tank portion 17 and an inwardly sloped section 38c extends above the tank 17 to terminate between the upper ends of support members 26. At various points along the track, the rails may be reinforced by cross pieces or struts (not shown).

The upper ends of the rails 38 are attached to a cross brace 42 (FIG. 6) which rigidly interconnects the ends of the support members 26. Removably mounted on cross brace 42 and support members 26 is a hitch or "fifth wheel" attachment 41, shown only in FIG. 2, employed for towing the bin 11 during transit.

Mounted on cross bracing (not shown) between members 26 at the upper end of the bin is a level indicating device 44. Indicator 44 includes a background plate 45 hingedly mounted to pivot at least from a position substantially normal to the plane of the members 26 to a position substantially parallel to the plane of members 26. As shown in FIG. 6, the front face of the plate 45 preferably includes a background colored area 45a and a contrasting colored stripe or wedge area 45b vertically and centrally of the plate 45. A needle 46 is pivotally mounted on the front face of the plate 45 near the upper end of the wedge area 45b and is operable to swing freely across the face of the plate 45. The position of the needle 45 coinciding with the center of the wedge area 45b indicates a level torsional condition of the bin.

To support the surge bin in a longitudinally horizontal position when disconnected from a towing vehicle, forward support legs 48 attached to the structural members 26 are provided. The legs 48 may be hydraulically powered to raise the bin slightly for disconnection of the fifth wheel from the towing vehicle.

As previously mentioned, the conveyor 12 may be any one of several types well known to those in the asphalt industry. An example of a typical conveyor for use with this invention is disclosed in U.S. Pat. No. 3,756,379 issued Sept. 4, 1973 to Rheinfrank, and entitled "Inclined Drag Conveyor for Hot Asphalt Mix and the Like". Conveyors of this genre commonly include a feed hopper 50 which may be positioned under the pug mill of the production plant or may be fed by an auxiliary conveyor from the pug mill, the main body portion 51 inclined against the bin 11, and a discharge 52 at the upper end. The conveyor discharge 52 is equipped with a flange 52a which is bolted to the extendable flange 22 of the chute 21 for discharge of hotmix to the feeder 20. In the operating condition, as shown in FIG. 5, the conveyor 12 is further secured to the bin 11 by means of one or more turnbuckles 53a connected between the rails 38 and brackets 53b fixed to the underside of the conveyor.

As is conventional, the conveyor 12 is provided a power unit (such as motor M) to drive the conveyor. Walkways (not shown) may likewise be installed along the length of the conveyor for maintenance and inspection.

To be adapted for use with this invention to provide the portable feature, the lower end of the conveyor 12 is mounted on a running gear 54. A connection bracket 55 hingedly connects the conveyor 12 to the wheel assembly 54, permitting the conveyor to pivot upwardly about the shaft 56 of the wheel assembly. To permit connection with a towing vehicle, the conveyor 12 is further provided with a removable fifth wheel or towing hitch 57 (FIG. 1). A pair of extendable support legs 58 are mounted on each side of the conveyor to support the upper end of the conveyor in a horizontal disposition after it has been disconnected from its towing vehicle.

The forward or upper end of the conveyor 12 is also provided with a roller yoke 60 which, as shown in FIG. 7, includes a pair of rollers 61 rotatably pinned between forks 62 mounted on a crosspiece 63. Rollers 61 are spaced apart so as to ride on the erection rails 38 attached to the bin. For limited pivotal movement, the crosspiece 63 is pinned at 64 between the forward end of the conveyor and a brace structure comprising the vertical supports 65 bolted to the conveyor frame 67 and a mounting plate 66 welded to the supports 65.

Adapted to position and support the surge storage system, the subframe 13, as shown in FIG. 9, underlies the bin and conveyor in ground engaging fashion. The stilt legs 23 and 24 of the bin are supported on pads as shown in FIG. 8; the pads underlying legs 23b and 24b are designated by the numeral 70 and the legs 23a and 24a pivotally are supported on pads 69 by removable pin members 72. The pads 69 are rigidly interconnected by a cross member 71 and each pad 70 is attached to an elongate beam 73 which is removably locked to the cross member 71 (FIG. 8). The pads 70 are interconnected and disconnectably pinned to a cross tie 74. When the beams 73 are disconnected from cross member 71, the beams 73 and their associated pads 70 may be telescopingly moved together on the cross tie 74.

Extending from each pad 69 is an elongate compression rail 75 which carries a removable pin 77 (FIG. 9) for coupling a hydraulic cylinder. The compression rails 75 are held in parallel alignment by a plurality of removable cross braces 76.

Underlying the conveyor 12, the wheel chock assembly 15 (FIG. 9) includes a pair of wheel chocks 81 held in spaced parallel relationship by removable bracing members 82. The wheel chock assembly 15 is connected to the pads 70 of the bin subframe by a pair of tension cables 79 which may be adjusted by turnbuckles 80.

On each side of the bin, a hydraulic cylinder 86 is interconnected between the pin 77 of the compression rail 75 and the pin 28 of the bracket 27 attached to the elongate structural beam 26 of the bin. In a transit condition, however, the cylinders 86 are pinned to the bracket 27 and to forks 83 attached to the beams 26 as shown in FIG. 1. For convenience, the cylinders 86 are preferably a multistage, telescoping type. To supply hydraulic fluid to the cylinders 86, they are fitted with hoses 87 connected to a conventional, portable hydraulic power unit 85. The power unit 85 typically includes a suitable valving system to regulate the hydraulic fluid flow so as to pressure each cylinder 86 equally, causing both of the cylinders to extend or retract at the same rate. On the other hand, the valve controls permit the operator to supply power to each cylinder 86 individually if the two cylinders fall out of synchronization as they are extended or retracted. Referring again to FIG. 8, mounted on each pad 70 is a switch 88 which, when engaged by stilt leg 23b or 24b, overrides the control of the valving system or the operator controls to shut off power to the cylinder 86 on the associated side of the bin.

Operation

In the following operational description, it is assumed that the self-erecting surge storage system is in a transit condition arriving at a new job site. This being the case, the bin 11 will be in a substantially horizontal position, being towed by the hitch 41 coupled to a truck tractor. Likewise, the conveyor 12 is disposed in a substantially horizontal position, being towed by the hitch 57 coupled to a second truck tractor or similar towing vehicle. The collapsible nature of the bin subframe 13 and the wheel chock assembly 15 permits convenient storage within the bin 11 during transit. Unless the asphalt plant already has a portable power unit 85 on site, this equipment may also be towed to the job by a suitable vehicle.

The first step in the erection process is to position the conveyor wheel chock assembly 15 at a predetermined location near the production plant so the feed hopper 50 of the conveyor will be beneath the pug mill or beneath the discharge of any auxiliary transfer conveyor from the pug mill. With the aid of the towing vehicle, conveyor 12 is backed onto the chock assembly 15 with its wheels resting on the wheel chocks 81. With legs 58 being extended to support the conveyor, the towing vehicle may be disconnected and the hitch 57 is then removed from the conveyor. The bin subframe 13 is then assembled and spaced the proper distance from the wheel chock assembly 15, and the two components are connected with the tension cables 79.

With the aid of the towing truck, the horizontally disposed bin 11 is slowly backed toward conveyor 12 until the sloped section 38a of the track engages the roller 60 as shown by FIG. 1. As the bin is backed further, roller yoke 60 rides upwardly on the ramp section 38a and the support legs 58 on the conveyor may then be retracted. When bin 11 is backed to the position shown in FIG. 2, the roller yoke 60 rides on the straight section 38b of the track and stilt legs 23a and 24a can be pivotally pinned to the support pads 69 by inserting the pins 72 therethrough. After bin 11 has been pinned to subframe 13, support legs 48 are extended to support the bin and the towing vehicle is uncoupled from the hitch 41. Thereafter, the hitch 41 may be removed from the bin.

The hydraulic cylinders 86 are then disconnected from the fork carriers 83 attached to the bin and are reconnected to the compression rails 75 by pins 77. With the hydraulic hoses 87 coupled to the power unit 85, the operator activates power unit 85 to extend the cylinders 86 which gradually pivots bin 11 upwardly about a horizontal axis coincident with the pins 72 in the support pads 69. As the bin is raised by the gradually extending cylinders 86, rollers 61 ride upwardly along the track 38, thus simultaneously raising the front portion of conveyor 12 in response to the upward pivoting of bin 11 as shown in FIG. 3.

When the bin has been elevated to the fully upright position shown in FIG. 4, the stilt legs 23b and 24b come to rest on the support pads 70, to which the legs may then be secured. Switches 88 automatically shut off the power unit 85 when the bin legs 23b and 24b contact pads 70 if the operator does not manually do so. With the bin in its erect operational position, the turnbuckles 53 are installed to lock the bin and conveyor together as a rigid structure, and the flange 22 is extended from the chute 21 and bolted to the conveyor discharge 52.

Both hydraulic cylinders 86 preferably extend and retract at the same rate during raising and lowering the bin to assure that the bin is not in torsion during movement. However, due to the inprecision of the hydraulic controls or in the event of a malfunction, one cylinder may extend faster than the other and the level indicator 44 will alert the operator to the situation so he can take the proper corrective measures. Because the background plate 45 is pivotally connected to the bin, it hangs vertically throughout the raising and lowering of the bin. If the bin becomes twisted during erection, the indicator needle 46 will swing from the striped area 45b (safe condition) to the contrasting background portion 45a (danger condition) to inform the operator of any slight twisting of the bin. Upon recognizing a danger condition, therefore, the operator can manipulate the proper control valves to halt the further extension of the appropriate cylinder until the two cylinders are again extended exactly the same amount.

To complete the installation, the two cross braces 30a and 30b are removed from legs 23 and 24 and one of the braces 30a or 30b is reinstalled between the bin legs 23b and 24b. The inclined rails 38a (shown in broken lines in FIG. 8) are then detached, thereby completing the formation of a space beneath bin discharge outlet 19 defining a drive-through large enough to accommodate a dump truck or other load carrying vehicle.

When the bin subframe 13 is securely locked to the bin in the manner described, it provides a rigid foot to counteract the moment of the conveyor bearing against the top of the bin. Consequently, the hydraulic pressure in the cylinders 86 may then be relieved to reduce wear on the cylinders or the cylinders may be removed altogether. Alternatively the cylinders may remain in the extended position, but would then preferably be covered for protection against corrosion and contamination.

To further increase temporary storage capacity, it should be apparent that a similar erection process can be utilized to raise an additional bin (without associated conveyor 12) beside the first erect bin. A short horizontal transfer conveyor of a type well known to those in the asphalt industry can be pre-attached to the top of the second bin to communicate with the outlet of the elongate conveyor 12, allowing the introduction of hotmix into the top of either bin. In this manner, a plurality of bins can be erected side by side to handle any desired volume of hotmix.

When the self-erecting surge storage system is to be moved to another job site, it can be lowered from the erect position (FIG. 4) to the horizontal transport position (FIG. 1) by a reversal of the steps previously described with respect to the erection process. Hydraulic pressure is first built up in the cylinders 86 to support the bin. The stilt legs 23b and 24b are unbolted from the support pads 70 and cross brace 30 is removed. The two cross braces 30a and 30b and the ramp rails 38a are resecured in their original positions (broken lines in FIG. 8), and conveyor 12 is disconnected from its attachment to the bin. The cylinders 86 are then retracted to pivot bin 11 downwardly; the roller yoke 60 carries the conveyor 12 downwardly on the track 38. When the position of FIG. 2 is reached, the fifth wheel 41 of bin 11 is attached and connected to a towing vehicle and the bin is towed slowly forward until conveyor 12 rests in the horizontal position shown in FIG. 1. Conveyor 12 may then be connected with its towing vehicle and the subframe 13 and wheel chock assembly 15 may be disassembled for storage in the bin.

Over the road, the bin 11 and conveyor 12 present a low enough profile when in the horizontal transport position to assure adequate clearance for passage beneath bridges, overpasses, and low hanging wires. And, at the new job site, the system can be quickly and safely erected once again.

From the foregoing it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and to within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described our invention, we claim:

1. A portable, self-erecting storage system comprising:
 a storage bin including a large volume tank and a supporting frame therefor, said bin positionable in a substantially horizontal position and in a vertical, operational position;
 a foundation structure underlying said storage bin in ground engaging fashion and providing a pivotal connection with said bin, said pivotal connection defining a horizontal pivot axis;
 power means including a pair of extendable hydraulic cylinders pivotally connected to said bin and said foundation structure on each side of said bin to pivot said bin on said horizontal pivot axis from the horizontal position to the operational position and from the operational position to the horizontal position; and visual indicating means connected to said storage bin to detect and indicate the torsional condition of said bin during the pivotal raising and lowering thereof.

2. The storage system as in claim 1, said visual indicating means comprising a pivotal plate member with a horizontal pivot axis mounted on said bin and an indicator arm pivotally pinned to said plate member to freely swing with respect thereto, whereby said plate member remains substantially vertically oriented during the raising and lowering of said bin and said indicator arm indicates any twisting condition to which said bin may be subjected by the uneven extension of said hydraulic cylinders.

3. A portable, self-erecting storage system comprising:
  a storage bin including a large volume, material storage tank and a supporting frame therefor, said bin positionable in a substantially horizontal position and in a vertical, operational position;
  an elongate, material transfer conveyor having a material receiving end and a material discharge end, said conveyor positionable in a substantially horizontal position and in an inclined, operational position adjacent said bin in said operational position with the discharge end of said conveyor disposed above said storage tank whereby material fed to said conveyor at said receiving end is conveyed to said discharge end and is discharged therefrom to said storage tank;
  a foundation structure underlying said bin and said conveyor in ground engaging fashion to support said bin and to support the receiving end of said conveyor, said foundation structure providing a pivotal connection with said bin and said pivotal connection defining a horizontal pivot axis;
  track means connected longitudinally to said storage bin; and
  power means communicating between said foundation structure and said storage bin to simultaneously pivot said bin on said horizontal pivot axis from the horizontal position to the operational position and elevate along said track means the discharge end of said conveyor from the horizontal position to the inclined operational position and to simultaneously pivot said bin on said horizontal pivot axis from the operational position to the horizontal position and lower along said track means the discharge end of said conveyor from the inclined operational position to the horizontal position.

4. The storage system as in claim 3, said storage bin including a running gear near the lower end thereof and a hitch connection near the upper end thereof to facilitate over-the-road transport with the aid of a towing vehicle coupled to said hitch connection.

5. The storage system as in claim 3, said conveyor including a running gear near the receiving end thereof and a hitch connection near the discharge end thereof of facilitate over-the-road transport with the aid of a towing vehicle coupled to said hitch connection.

6. The storage system as in claim 3, said foundation structure comprising, in an assembled condition, a first rigid framework supportingly underlying said bin and providing said pivotal connection therewith, a second rigid framework supportingly underlying the receiving end of said conveyor, and linkage means interconnecting said first and second frameworks, but said foundation structure being, in a disassembled condition, readily stowable within the tank of said storage bin for transit.

7. The storage system as in claim 3 including visual indicating means connected to said storage bin to detect and indicate the torsional condition of said bin during the pivotal raising and lowering thereof.

8. The storage system as in claim 3, said power means including a pair of extendable hydraulic cylinders pivotally connected to said bin and to said foundation structure on each side of said bin and a portable, hydraulic pressure generation plant connected to said hydraulic cylinders.

9. A method of erecting an asphalt surge storage system from a substantially horizontal, transit position to an operational position without the aid of a crane or similar hoisting equipment, said storage system comprising a surge storage bin having a large volume tank surmounting a supporting frame that provides a drive-through in which a hauling vehicle may be positioned to receive material dispensed from the storage tank and an elongate, material transfer conveyor having a material receiving end and a material discharge end and being inclined in an operational position adjacent said storage bin with the discharge end of the conveyor disposed above said storage tank whereby material fed to said conveyor at said receiving end is discharged therefrom to said storage tank, the erection method comprising the steps of:
  providing a ground engaging foundation for the erection and support of said storage system;
  securing one edge of the lower end of said supporting frame to said foundation to thereby define a horizontal pivot axis;
  installing a conveyor guidance track longitudinally to said storage bin;
  engaging the discharge end of said conveyor with said guidance track;
  securing the receiving end of said conveyor to said foundation; and
  supplying an oppositely urging force between said foundation and said storage bin at a position remote from said horizontal position to an upright, operational position and elevating along said guidance track the discharge end of said conveyor from said horizontal position to an inclined, operational position.

* * * * *